June 28, 1966     J. T. ROHR ETAL     3,258,113
COIN SAVING BOOK
Filed Oct. 11, 1963     2 Sheets-Sheet 1
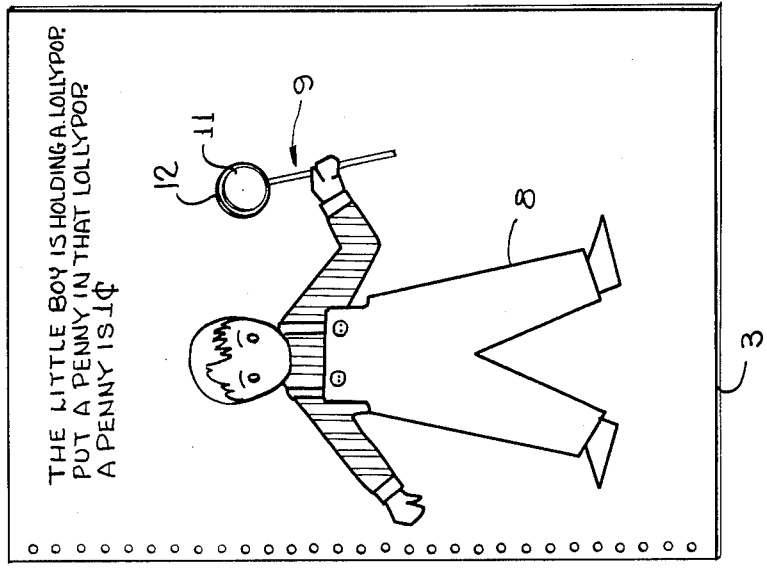
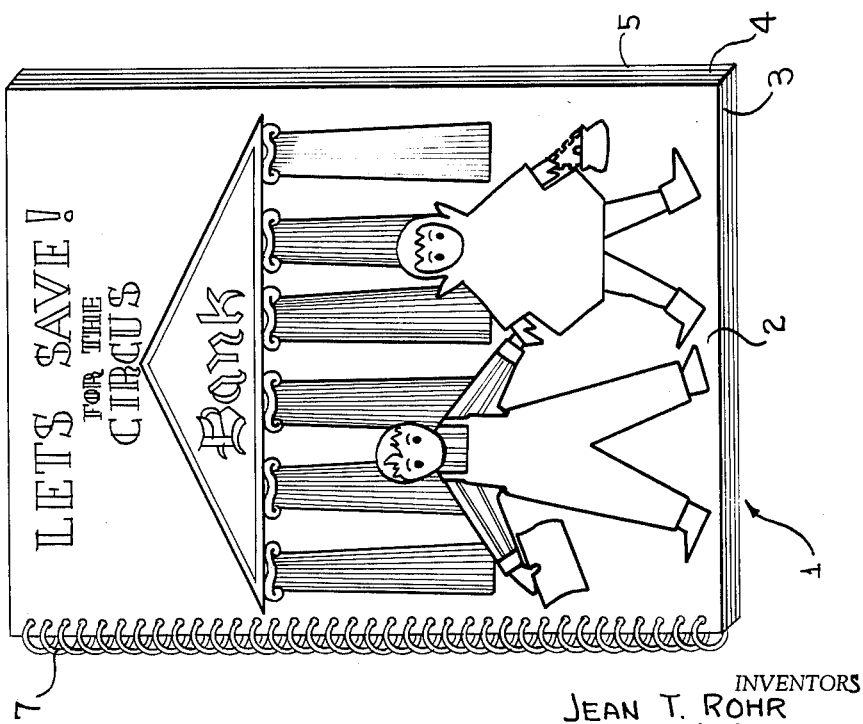
INVENTORS
JEAN T. ROHR
& EDWARD L. COLEMAN
BY *Hurvitz & Rose*
ATTORNEYS June 28, 1966    J. T. ROHR ETAL    3,258,113
COIN SAVING BOOK
Filed Oct. 11, 1963    2 Sheets-Sheet 2

INVENTORS
JEAN T. ROHR
& EDWARD L. COLEMAN

BY *Hurvitz & Rose*

ATTORNEYS

United States Patent Office 3,258,113
Patented June 28, 1966

3,258,113
COIN SAVING BOOK
Jean T. Rohr, 6008 Burnt Oak Road, and Edward L. Coleman, 1333 Harden Lane, both of Baltimore, Md.
Filed Oct. 11, 1963, Ser. No. 315,605
1 Claim. (Cl. 206—.83)

The present invention relates to coin-saving devices, and more particularly, to a coin-saving device in the form of a book which is intended to encourage children to save and also to teach the interrelationship between the various denominations of coins.

The coin-saving book of the present invention is intended to provide a child with a specific purpose for saving by relating the story material and illustrations in the book to some future event or object of interest to the child and in which event he may wish to participate or which object he may desire to purchase. For instance, the book may be entitled "Let's Save for the Circus." The various illustrations in the book depict things a child would be likely to do or see at the circus. Each of the various pictures has, as an integral part of the illustration, circular representations of objects with coin-receiving apertures associated with the circular representations so that the coin, when inserted in the receiving aperture, becomes an integral part of the illustration. For instance, and employing the illustration used above, the child while at the circus may buy a lollipop. Therefore, there may be an illustration of a child holding a lollipop. Within the confines of the circular representation of the lollipop is a coin-receiving aperture so that, when the coin is inserted therein, the coin becomes identified with the illustration. Further, at the circus the child may see a clown juggling objects; the objects may be round; and coin-receiving apertures may be associated with each of the circular apertures so that the coins, when inserted, become a part of the picture; that is, the objects being juggled by the clown.

Thus, the book is related to an event for which the child may wish to save and the coin-receiving apertures within the book are directly related to portions of the illustrations therein which illustrations are, in turn, related to the event.

Further, in accordance with the invention, the number and arrangements of circular objects in the illustrations may be such as to teach the cihld interrelationships between various coins. As will be described further below, the clown may have a pom-pom on the top of his hat. The pom-pom may have a coin-receiving aperture associated therewith of such a size as to receive a quarter. The clown may be juggling twenty-five circular objects, each of which has associated therewith coin-receiving apertures of a size to receive pennies. There are twenty-five pennies in a quarter and, therefore, as indicated by the written material on the page, the value of the number of pennies on the page is equal to the value of the single quarter also appearing on the page.

The book itself is formed of a plurality of relatively thick pages, each of which has one or more related representations thereon. The thickness of each page is such as to take the thickness of the largest coin to be saved.

Preferably, the coin-receiving apertures are circular apertures of a diameter such as to frictionally hold a coin of the proper denomination when inserted therein. The invention is not limited to this specific type of coin-receiving aperture although it is preferred since under these conditions, when the book is closed, the pages lie flat against one another.

It is, therefore, an object of the present invention to provide a coin-savings book having a plurality of pages of sufficient thickness to receive the thickness of a coin and in which at least some of the pages have imprinted thereon illustrations depicting various events and objects and wherein each of the characters includes, as an integral part of the representation, circular members and a coin-receiving aperture located within the confines of the circular representations so that the coin, when inserted, becomes an integral part of the material in the book.

It is another object of the present invention to provide a book for saving coins for a specific event and also for teaching the interrelationship between the values of various coins which book includes a plurality of relatively thick pages, illustrations on the pages depicting various occurrences and activities related to the event for which the child is saving, the illustrations having circular representations forming integral parts of the illustrations and coin-receiving apertures located within the circular representation so that the coins form a part of the picture and further having an aperture adapted to receive a coin of a first denomination and a plurality of coins of a denomination which is a submultiple of the first coin's denomination, the number of the second group of apertures being equal to the number of the second group of coins having the same value as the first coin.

The above and still further objects, features and advantages of the present invention will become apparent upon consideration of the following detailed description of one specific embodiment thereof, especially when taken in conjunction with the accompanying drawings, wherein:

FIGURE 1 is an illustration of a cover page which may be employed with the book of the present invention;

FIGURE 2 is an illustration of one inside page of the book illustrating a child holding a lollipop;

Figure 4:
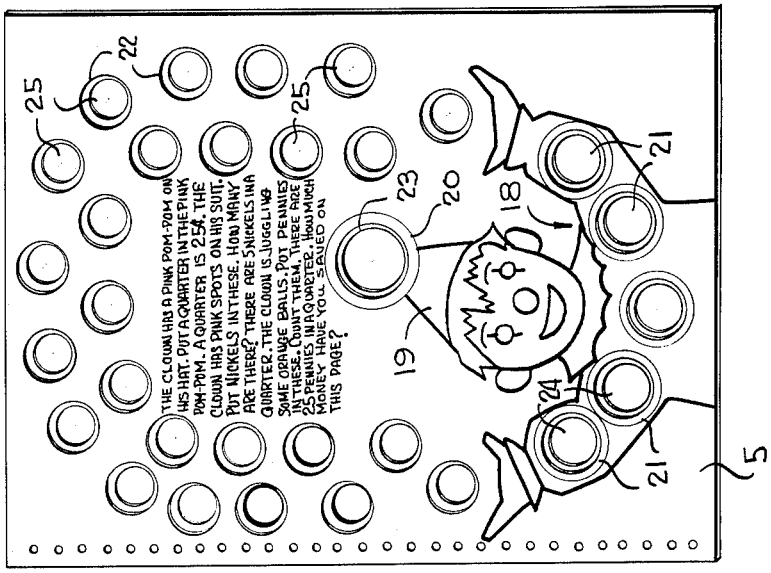
FIGURE 4 is an illustration of a third inside page of the book illustrating a clown juggling various objects.

Referring specifically to FIGURE 1, there is illustrated a book generally designated by the reference numeral 1 comprising a plurality of pages 2, 3, 4 and 5 bound together at the left edge by a spiral binder 7. In this particular illustration, the first page of the book 1 constitutes a cover, although of course a separate cover may be employed. Also, the showing of the spiral binder 7 is intended to be by way of example, other methods of binding the book being wholly acceptable.

The front cover of the book has imprinted adjacent the upper edge thereof the words "Let's Save!" and in smaller letters thereunder is a designation of the particular event for which the child is to save. In the illustration under consideration, the saving is "For The Circus," so that the entire title becomes "Let's Save! For The Circus." The first page also has an illustration which is intended to represent a bank and, in front of the bank a small boy and girl are standing and holding hands. The first page is intended to set the theme for the book; that is, to save for a trip to the circus, the bank being representative of the fact of saving and the boy and girl being representative of the children who are to utilize the book.

Referring now specifically to FIGURE 2 of the accompanying drawings, there is illustrated, for instance, the second page of the book; that is, the page designated in FIGURE 1 by the reference numeral 3. The figure on the page, which is designated by the reference numeral 8, is of the small boy who also appears on the cover page and he is holding a lollipop 9 in his left hand. The edible portion of the lollipop is represented by a circle 11 and the circle is apertured as indicated by the line 12 to receive a penny. The title on the page is "The little boy is holding a lollipop. Put a penny in that lollipop. A penny is 1¢." Therefore, the child is told to insert a penny into the aperture 12 so that the penny becomes, in effect, the representation of the edible portion 11 of the lollipop and, in consequence, becomes an integral part of the illustration. The line 12 may, in fact, be coincident with the outer line of the circle 11 or may lie slightly inwardly thereof. Preferably the lines are coincident.

Figure 3:
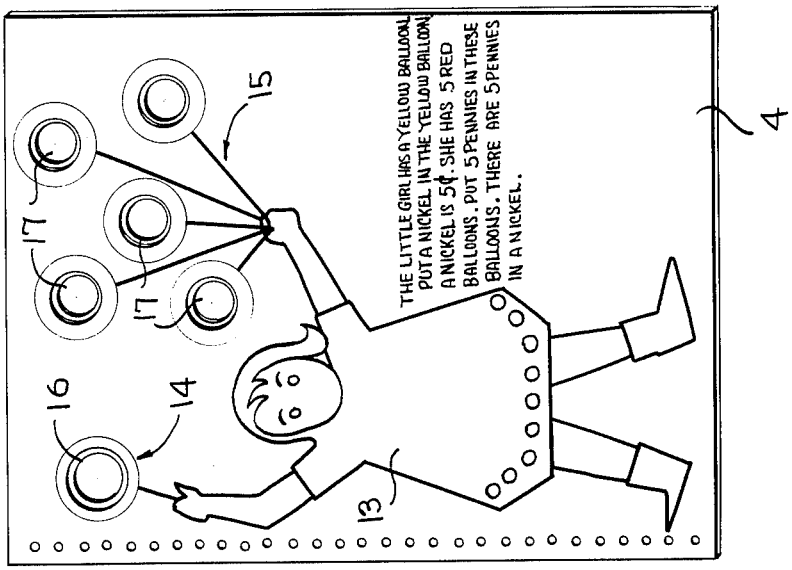
FIGURE 3 is an illustration of a second inside page of the book showing a child holding a plurality of balloons.

Referring now specifically to FIGURE 3 of the accompanying drawings, there is illustrated the third page, reference numeral 4, of the book. The page has imprinted thereon an illustration of a little girl 13 who is the same little girl that appears on the cover of the book. In her right hand she carries a balloon, generally designated by the reference numeral 14 and in her let hand she holds the strings to five balloons generally designated by the reference numeral 15. The balloon 14 has formed within the confines of the circular representation of the balloon, a coin aperture 16 of such a size as to receive a nickel. An aperture 17 is formed in each of the balloons 15 in her left hand and each of the apertures 17 is of such a size as to receive a penny. The legend appearing on the page is printed in FIGURE 3 and, in effect, states that the child is to put a nickel in the balloon in the right hand and a penny in each of the balloons in the left hand and further that a nickel is 5¢ and that five pennies make a nickel. Thus, the child is taught the relationship between the two coins; that is, the penny and the nickel. It will be noted from the legend appearing in FIGURE 3 that various colors may be employed in helping to educate the child, the picture stating that the balloon in the right hand is a yellow balloon and the balloons in the left hand are red balloons.

Referring now specifically to FIGURE 4 of the accompanying drawings, there is illustrated the fourth page of the book, designated by reference numeral 5. The illustration is of a clown generally designated by the reference numeral 18 who is wearing a clown hat 19 having a pom-pom 20 at the top thereof. The clown is illustrated as juggling a plurality of circular objects and five of these objects, designated by the reference numeral 21, are illustrated as passing from the arms across the front of the clown's body. There are also illustrated twenty-five balls 22, in the air above the clown and are intended to illustrate that portion of the objects being juggled which are at any time in the air and traveling between the two hands of the clown. As indicated by the written material appearing on the page and illustrated in FIGURE 4, the coin-receiving aperture 23 is formed in the pom-pom 20, the aperture being of such a size as to receive a quarter. coin-receiving aperture 23 is formed in the pom-pom 20, circular representations 21, each of these apertures being adapted to receive a nickel. There are five nickels in a quarter. Each of the twenty-five balls or circular objects in the air has a coin-receiving aperture 25 associated therewith, each of these objects being of such a size as to receive pennies. There are twenty-five pennies in a quarter. In its entirety, the material sets forth the fact that there are twenty-five pennies in a quarter and five nickels in a quarter.

It will be noted that each of the illustrations relates to things a child may see or do at the circus and has associated integrally with each of the illustrations circular members and coin-receiving apertures within the circular members so that when coins are placed in the apertures, the coin becomes an integral part of the picture. More particularly, in FIGURE 2, the child buys a lollipop. The lollipop is illustrated as being round and has a round coin-receiving aperture located within the lollipop. On page 4; that is, FIGURE 3, the little girl is illustrated as having six balloons, each balloon having a coin-receiving aperture so that, when the coins are applied to the apertures, they become a part of her picture. A child very often buys a balloon at the circus so that this activity is related to the main event for which the child is being encouraged to save. In FIGURE 4, there is depicted a page of the book which illustrates a clown performing a juggling act which is also something that the child is very likely to see at the circus. The various objects being juggled are round and each has associated therewith a coin-receiving aperture so that the coins when inserted therein become a part of the picture. Also, the clown has a pom-pom on his hat and this is round and also has a coin-receiving aperture.

It is not intended to limit the scope of the present invention to saving for going to the circus since one could save for going to the zoo, with various animals in the zoo being depicted and having the coin-receiving apertures associated with the various animals such that when coins are inserted they become an integral part of the picture. Again, the groupings of circular representations and the apertures associated therewith may be such as to teach the interrelationship between the various coin denominations.

While we have described and illustrated one specific embodiment of our invention, it will be clear that variations of the details of construction which are specifically illustrated and described may be resorted to without departing from the true spirit and scope of the invention as defined in the appended claim.

What we claim is:

A book for saving coins for a specified event and for teaching the interrelationship between the values of various coins, comprising a plurality of pages each of a sufficient thickness to accept the thickness of a coin, at least some of said pages having illustrated thereon characters depicting various occurrences, activities, objects and persons related to said event, each of the characters including a plurality of geometrical representations as an integral part of the character depicted, said pages having coin-receiving apertures formed in the surfaces thereof, each of said coin-receiving apertures being disposed within the boundaries of one of said geometrical representations forming portions of said characters, one of said apertures being of a size and shape to receive a first coin of a specific denomination, others of said apertures being of a size and shape to receive second coins of a denomination which are a submultiple of said first coin and the total of said others of said apertures for receiving said second coins being equal in number to the number of said second coins which equals the value of said first coin.

References Cited by the Examiner

UNITED STATES PATENTS 2,723,464 11/1955 Zalkind _____ 35—32
3,064,805 11/1962 Bains _____ 206—0.83

FOREIGN PATENTS 30,517 3/1932 Australia.

THERON E. CONDON, *Primary Examiner.*

J. M. CASKIE, *Assistant Examiner.*